Figure 1:
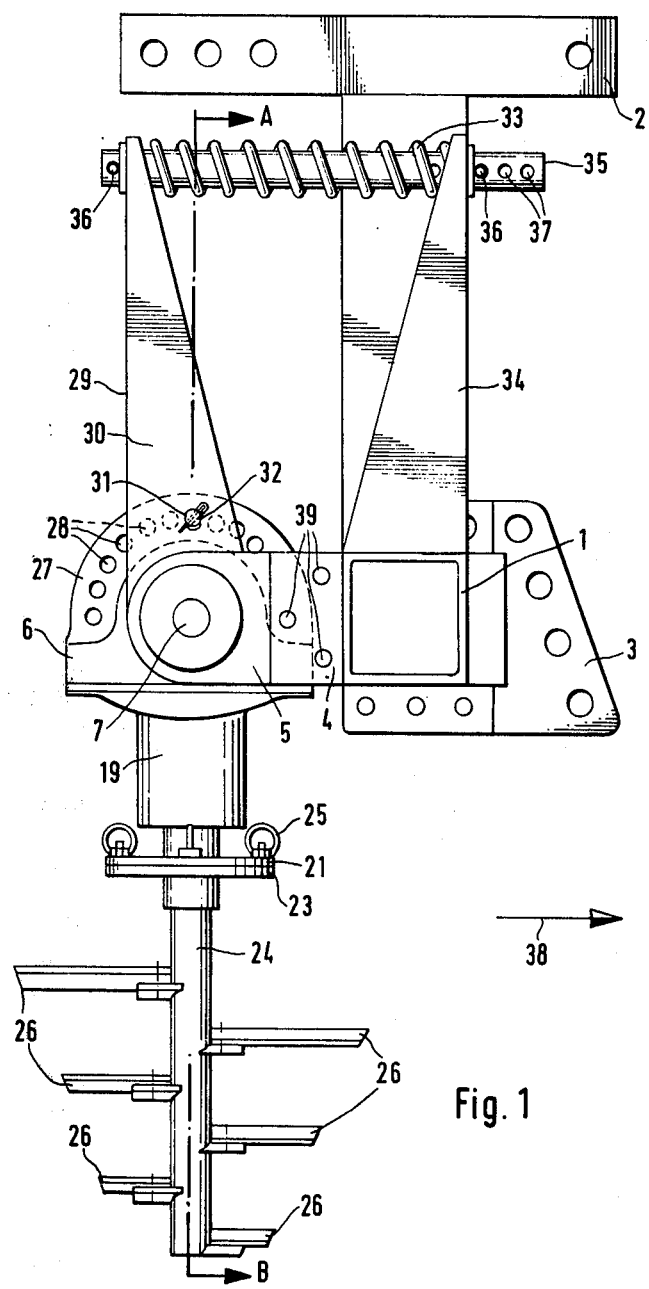

United States Patent [19]

Gross-Scharmann

[11] 4,148,364
[45] Apr. 10, 1979

[54] CULTIVATING MACHINE

[75] Inventor: Franz Gross-Scharmann, Oldenburg, Fed. Rep. of Germany

[73] Assignee: Amazonen-Werke H. Dreyer, Hasbergen-Gaste, Fed. Rep. of Germany

[21] Appl. No.: 827,903

[22] Filed: Aug. 25, 1977

[30] Foreign Application Priority Data

Sep. 1, 1976 [DE] Fed. Rep. of Germany ....... 2639272

[51] Int. Cl.² ............................................. A01B 33/06
[52] U.S. Cl. ........................................ 172/58; 172/59; 172/103; 172/117; 172/125
[58] Field of Search ................. 172/117, 59, 103, 125, 172/58

[56] References Cited

U.S. PATENT DOCUMENTS 1,659,674  2/1928  Turner .............................. 172/117 X
4,042,039  8/1977  Lely ................................. 172/117 X

FOREIGN PATENT DOCUMENTS 742528  12/1955  United Kingdom ...................... 172/59
1215052 12/1970  United Kingdom ...................... 172/59

Primary Examiner—Paul E. Shapiro
Attorney, Agent, or Firm—Sprung, Felfe, Horn, Lynch & Kramer

[57] ABSTRACT

A cultivating machine (FIG. 1) having a frame (1) for mounting of the machine on a tractor, and having arms (34) on which angle drives (6) for the cultivating tools (26) are mounted, resiliently joined thereto by way of arms (29) and connectors (33, 35, 36). A transverse shaft (7), by way of bevel gears, drives the tool holders (24) for rotation of the tools (26). The transverse shaft directly drives output shafts to which the tool holders are connected.

8 Claims, 2 Drawing Figures

CULTIVATING MACHINE

BACKGROUND

The invention relates to a cultivating machine having a frame with a transverse shaft on which angle drives with tool holders rotating in operation are individually mounted pivotally, the tool holders being drivable by the transverse shaft through the angle drives and the angle drives being equipped with arms between which and the frame resilient means are provided for the resilient mounting of the tool holders in the operating position.

A machine of this kind is known through German Offenlegungsschrift 25 38 306. This machine has the advantage that the tool holders, when in operation, can yield resiliently in the direction opposite the working direction, so that neither the angle drives nor the tool holders nor the cultivating tools disposed thereon can be damaged when these tools encounter large rocks or other similarly unyielding obstructions.

It is disadvantageous in this machine that, on each of the driven shafts of the pivotally mounted angle drives there is disposed an additional angle drive, the tool holders being situated on the driven shafts of this second angle drive. This results in considerable additional cost, since two complete angle drives are required for each tool holder.

In a special embodiment of these known machines, only one angle drive is mounted for pivoting about the other on the transverse shaft, while the angle drives located between them are joined rigidly to the frame. In these angle drives rigidly joined to the frame, the tool holders are disposed on the driven shafts of the drives. In this manner the cost of the tool holder arrangement is reduced by about half. On the other hand, however, only the angle drives which are pivotally disposed can yield resiliently in operation away from the working direction, while the danger of damage to the other angle drives, tool holders and cultivating tools upon collision with solid obstructions remains.

THE INVENTION

The invention is addressed to the problem of improving the known machine such that a simple construction will be achieved while preserving the advantage of the ability of all tool holders to yield resiliently.

This problem is solved by the invention in that the tool holders are disposed on the driven shafts of the pivotally mounted angle drives. The output shaft of each angle drive is directly driven by the transverse shaft and the tool holder of each angle drive is mounted on the output shaft for rotation therewith. As a result of this measure, only one angle drive needs to be provided for each tool holder. At the same time it has proven advantageous that the distances between the points at which the resilient elements are fastened to the arms and the points at which they are fastened to the frame are variable. Even so, the resilience for the yielding of the tool holders can be adapted to existing soil conditions or to the depth of penetration of the cultivating tools which is required in individual applications.

In a preferred embodiment, the invention furthermore provides that the arms for the resilient elements are disposed for angular adjustment with respect to the tool holders on the angle drives. This measure makes it possible to adjust the cultivating tools especially to the nature of the work to be performed without thereby impairing in any way the resilient yielding ability of the tool holders. If the operation involved is simply to prepare a plowed field for seeding, the arms are adjusted at such an angle to the tool holders that the axes of rotation of the tool holders assume an upright position, whereas for the chopping down of the stubble and vegetation remaining on the field after the harvest, the axes of rotation of the tool holders are to be in virtually or precisely the horizontal position. In this horizontal position, the replacement of the tool holders is also especially easy, since their fastening means are then in an easily accessible position. In the intermediate settings of the tool holders it is possible, depending on the type of tools used, to achieve good crumbling of the soil or a thorough mulching of the vegetation on an unplowed field. In this manner, an especially simple method of adjustment is achieved by disposing the arms for pivoting about the transverse shaft and joining them to the angle drives so as to be able to be locked at different angular attitudes with respect to the tool holders. Furthermore, the advantage is achieved by this measure that the booms always assume the same basic position with respect to the resilient elements and to the points at which they are fastened to the frame.

If the tool holders are fastened to the driven shafts of the angle drives in an easily releasable manner by a method disclosed in German Offenlegungsschrift 17 57 452, a further adaptation of the machine operation to existing circumstances can be achieved. This feature is also of great advantage for the rapid replacement of defective or worn cultivating tools.

Figure 2:
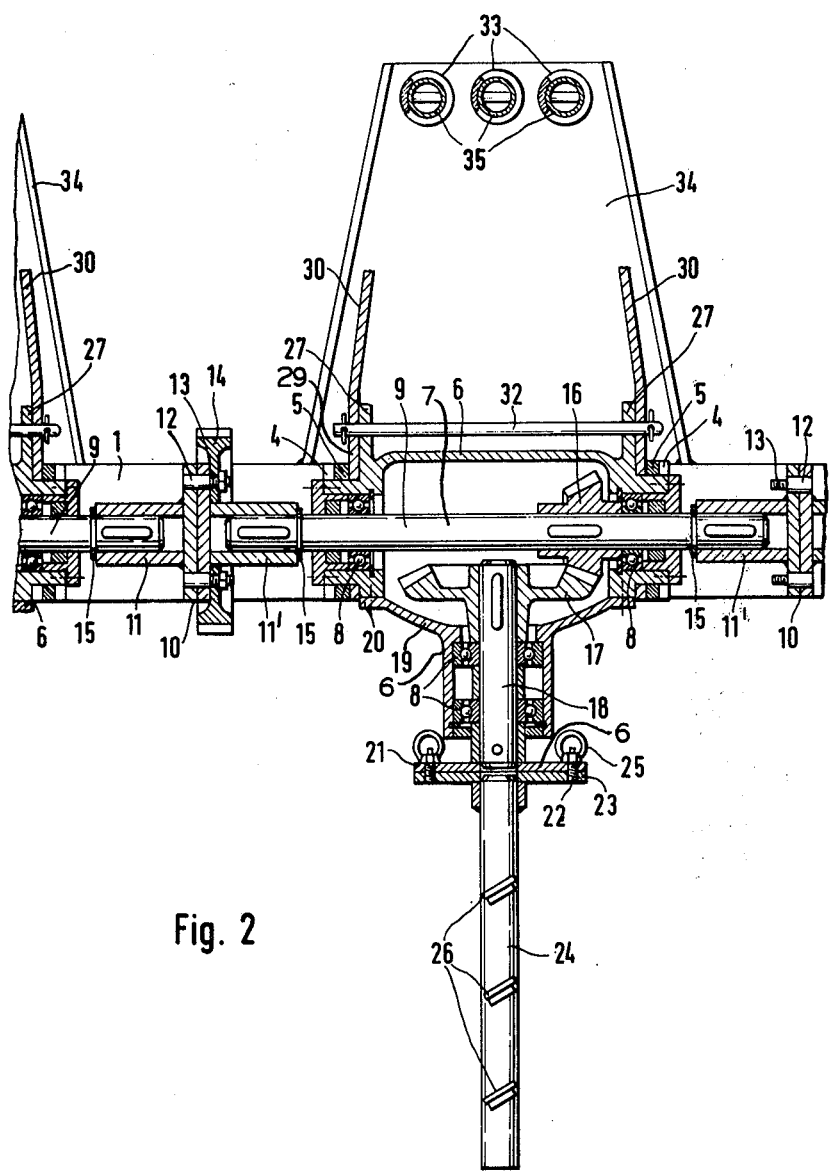

Provision is furthermore made in accordance with the invention for the transverse shaft to be divided into shaft sections aligned with one another, each of which passes through an angle drive, and which are joined together by means of couplings. This makes possible the rapid removal and installation of angle drives completely equipped with tool holders and cultivating tools, in case it should become necessary. If the shaft sections, the couplings and the angle drives longitudinally of the transverse shaft have equal dimensions, the complete angle drives can be interchangeable. Another advantageous result is the economical manufacture of the machine in great series, and ease in stocking parts for repair service, regardless of the working width which the cultivating machines have or are required to have. It is also possible, by installing some or all of the angle drives, after turning them 180°, to drive the tool holders of these angle drives in the opposite direction. The invention is further explained hereinafter with the aid of the appended drawing, wherein FIG. 1 is a side elevational view of a cultivating machine in accordance with the invention, and FIG. 2 is a cross-sectional view taken along line A—B of FIG. 1.

The cultivating machine has a frame 1 which is equipped with the coupling means 2 and 3 for the attachment of the machine to the power lift of a farm tractor. Also on the frame 1 are the fastening pieces 4 to which are bolted the bearings 5 for the pivotal mounting of the angle drives 6. In the angle drives, the transverse shaft 7 is rotatably mounted by means of the ball bearings 8, the transverse shaft 7 also forming the pivot axis of the angle drive 6. The bearings 5 are secured to pieces 4 by bolts 39.

This transverse shaft 7 is divided into the shaft sections 9, each of which extends the same length from both sides of each angle drive, the shaft sections being joined together by the couplings 10. These couplings 10 consist of the coupling halves 11 and 11', the coupling studs 12 being welded to the coupling halves 11, each having a threaded portion 13 for the attachment of the drive gear 14. The coupling halves 11 and 11' are secured against axial displacement on the shaft sections 9 by the snap rings 15. In a manner which is not represented, resilient coupling means, such as rubber buffers or rubber disks, for example, can be provided between the coupling halves 11 and 11'.

Within the angle drives 6 are the bevel gears 16 which are mounted on the shaft sections 9 and mesh with the bevel gears 17 disposed on the output shafts 18 of the angle drives 6. These output shafts 18 are rotatably mounted in ball bearings 8 in the bosses 19 which are bolted to the angle drives 6. The inside diameter of the flange 20 of the bosses 19 is greater than the outside diameter of the bevel gears 17. This construction provides for a simple assembly of the angle drives 6. Also it is possible to dismount the bosses 19 easily from the angle drives 6 for the performance of any necessary repairs.

At the lower end of the output shafts 18 are the flanges 21 to which the flanges 23 of the tool holders 24 are fastened by means of the studs 22 provided on said flanges 23, and the ring nuts 25. The cultivating tools 26, which extend radially outwardly, are bolted to the tool holders 24.

On the upper side on each angle drive 6 there is the arcuate adjusting segment 27 equipped with a plurality of holes 28. Futhermore, the arm 29 is rotatably mounted on each angle drive 6, its axis of rotation being that of the transverse shaft 7. In each of the side portions 30 of the arm 29 there is provided a hole 31 which is at the same distance from the transverse shaft 7 as the holes 28 in the adjusting segment 27. By turning the angle drive 6 in relation to the arm 29, the tool holder 24 can be placed at various angles with respect to the ground, and can be locked there by inserting the rod 32 into the holes 31 and into the holes 28 that are in line with them in the selected angular position. Thereby means are provided for adjusting the angles between the arms and the axes of the tool holders. As illustrated, the range of adjustment is from slanting of the tool holders away from the working direction 38 to a position in which the tool holders point horizontally away from the working direction. The arm 29 is supported resiliently by means of the three resilient means 33 against the arm 34 welded to frame 1, the three resilient means 33 being threaded over the tubes 35 which pass through the arms 29 and 34 and are secured by the pins 36 against axial displacement. These pins 36 thus also prevent any enlargement of the distance between the outer ends of the arms 29 and 34 beyond what is desired. In order to give the resilient means 33 a different bias to adapt them to soil conditions, a plurality of spaced bores 37 are provided in the tubes 35. The bores provide means for adjusting the spacing of the arms 29 on the frame 1.

The operation of the cultivating machine is as follows:

The tool holders 24 are driven by a power source, which is not shown, through the gear 14, the couplings 10, the shaft sections 9 and the bevel gears 16 and 17. If the rotating tool holders 24 are drawn through the soil in the direction indicated by the arrow 38, a torque acting on the transverse shaft 7 away from the direction of operation will result, which is canceled by the oppositely directed torque formed by the distance between the tubes 35 and the transverse shaft 7 and the tension of the resilient means 33.

If the cultivating tools in the tool holder 24 then encounter an obstacle, the tool holder is able to yield resiliently rearwardly and, after the obstacle has been passed, the tool holder is forced back to its starting position by the resilient means 33. Since the arm 29 in this case always assumes the same basic position, there will be no changes in this ability to yield, regardless of the angle at which the tool holder 24 is set with respect to the ground.

Now, if, for special work, the direction of the rotation of the tool holders 24 is to be changed, all that need be done is remove the mounting screws 39 from the fastening pieces 4, then remove the pins 36 on the side of the boom 29 from the pipes 35, and remove the snap rings 15 from the shaft sections 9. Then the angle drives 6 are removed and again fastened to the frame 1 after rotation in the horizontal plane by 180° and they are drivingly coupled together again.

What is claimed is:

1. In a cultivating machine having a frame with a transverse shaft on which angle drives with rotatable tool holders are individually pivotally mounted, the tool holders being driven by the transverse shaft through the angle drives and the angle drives having arms, resilient means interconnecting the arms and the frame for resilient holding the angle drives and the tool holders in the working position, the improvement which comprises each angle drive having an output shaft directly driven by the transverse shaft, and the tool holder of each angle drive being mounted on the output shaft for rotation therewith and means for adjusting the angles between the arms and the axes of the tool holders.

2. Cultivating machine of claim 1, the arms being pivotally mounted on the transverse shaft, said adjusting means comprising means for locking the arms on the angle drives to dispose the arms at selected positions on the angle drives so that the angles between the arms and the axes of the tool holders can be adjusted.

3. Cultivating machine from claim 2, said adjusting means providing a range of adjustment of a position in which the axes of the tool holders slant in the working direction to a position in which the axes of the tool holders point horizontally away from the working direction.

4. Cultivating machine of claim 3, the angle drives each including a housing, each output shaft being mounted in a drive boss which is removably mounted on the angle drive housing by a mounting flange of the boss, a bevel gear on the output shaft for said driving of the angle drive by the transverse shaft, the inside diameter of the mounting flange being greater than the outside diameter of the bevel gear.

5. Cultivating machine of claim 2, the angle drives each including a housing, each output shaft being mounted in a drive boss which is removably mounted on the angle drive housing by a mounting flange of the boss, a bevel gear on the output shaft for said driving of the angle drive by the transverse shaft, the inside diameter of the mounting flange being greater than the outside diameter of the bevel gear.

6. Cultivating machine of claim 1, the angle drives each including a housing, each output shaft being mounted in a drive boss which is removably mounted on the angle drive housing by a mounting flange of the boss, a bevel gear on the output shaft for said driving of the angle drive by the transverse shaft, the inside diameter of the mounting flange being greater than the outside diameter of the bevel gear.

7. Cultivating machine of claim 1, said adjusting means providing a range of adjustment from a position in which the axes of the tool holders slant in the working direction to a position in which the axes of the tool holders point horizontally away from the working direction.

8. Cultivating machine of claim 7, the angle drives each including a housing, each output shaft being mounted in a drive boss which is removably mounted on the angle drive housing by a mounting flange of the boss, a bevel gear on the output shaft for said driving of the angle drive by the transverse shaft, the inside diameter of the mounting flange being greater than the outside diameter of the bevel gear.

* * * * *

UNITED STATES PATENT AND TRADEMARK OFFICE
CERTIFICATE OF CORRECTION

PATENT NO. : 4148364
DATED : April 10, 1979
INVENTOR(S) : Franz Gross-Scharmann

It is certified that error appears in the above–identified patent and that said Letters Patent are hereby corrected as shown below:

Col. 4, line 43, change "from" to --of--.

Col. 4, line 44, change "of" (second occurrence) to --from--.

Signed and Sealed this

Eleventh Day of December 1979

[SEAL]

Attest:

SIDNEY A. DIAMOND

Attesting Officer

Commissioner of Patents and Trademarks